Sept. 29, 1931.    W. B. FAGEOL    1,825,344
FLEXIBLE GUARD FOR ROAD VEHICLES
Filed April 1, 1931
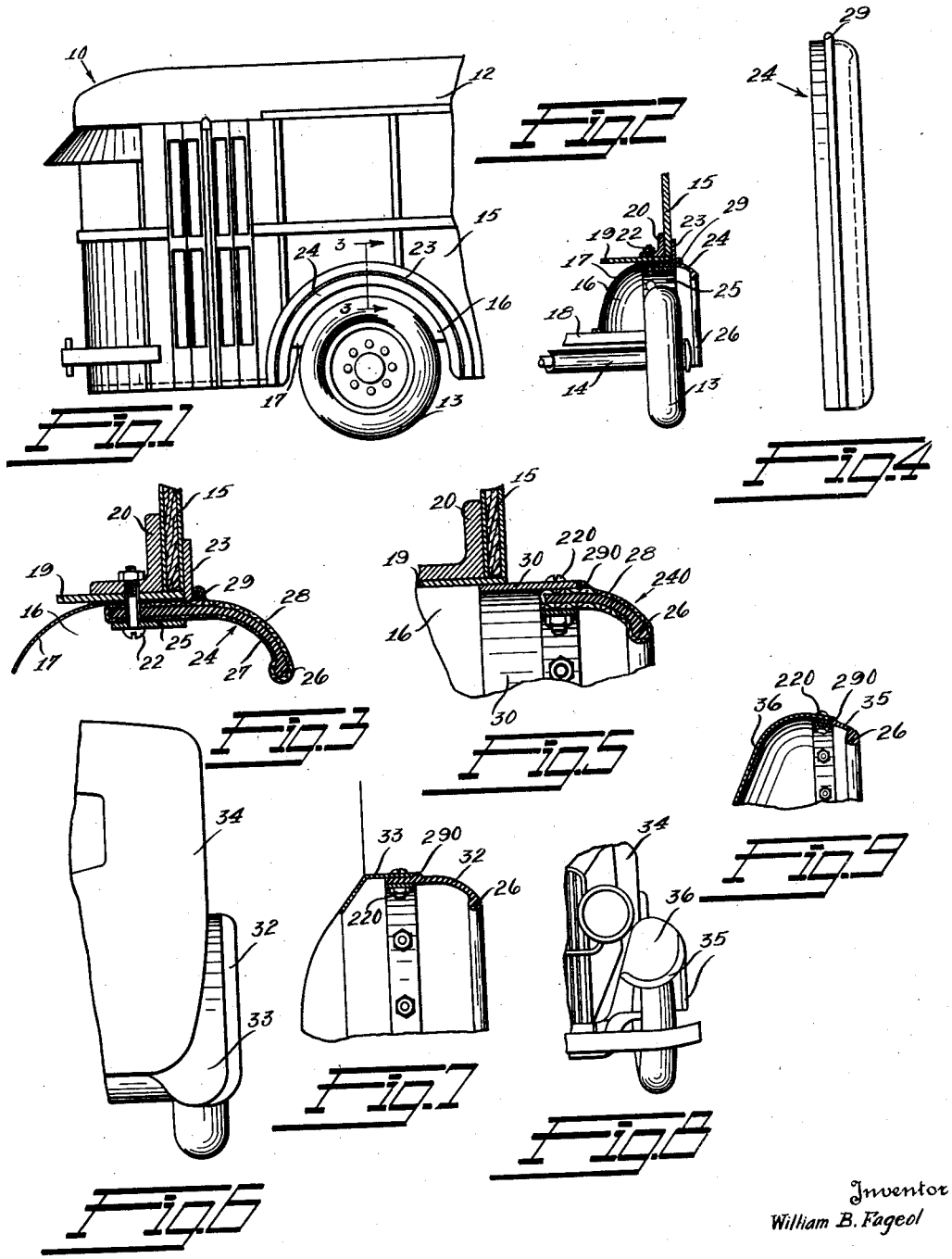
Inventor
William B. Fageol
By Strauch & Hoffman
Attorneys Patented Sept. 29, 1931

1,825,344

UNITED STATES PATENT OFFICE

WILLIAM B. FAGEOL, OF KENT, OHIO, ASSIGNOR TO TWIN COACH COMPANY, OF KENT, OHIO, A CORPORATION OF DELAWARE

FLEXIBLE GUARD FOR ROAD VEHICLES

Application filed April 1, 1931. Serial No. 526,997.

This invention relates to flexible guards or fenders for application to the bodies of automotive vehicles.

The devices of the present invention are not fenders, in the sense that this term defines the usual mud-guards or wheel housings of vehicle bodies, but are flexible devices designed for attachment to such mud-guards and wheel housings.

It is a primary object of this invention to provide flexible guarding extensions projecting laterally beyond the usual wheel housings,—i. e., beyond the body recesses or the overhanging rigid fenders, which ever the case may be. These lateral flexible extensions have the advantages of increasing the effectiveness of the splash guards, by preventing mud and the like from being thrown upon the vehicle body; of permitting the vehicle body proper to be widened to the maximum lawful width, with the flexible devices projecting without harm beyond said lawful width; of preventing permanent and visible damage to the body through minor accidents involving side-swiping and scraping; and of eliminating many serious or more damaging accidents, than those just mentioned, by virtue of a psychological effect on the drivers of other vehicles.

A further object of the present invention is to manufacture a flexible guard by molding it to give it proper form and appearance. The devices may be molded to predetermined size and radius, but preferably are molded in such manner that they may be applied to any one of a number of wheel housings of similar shapes and sizes.

Another object of my invention consists in the provision of an inner deformable bead on the longitudinal surface of the guard. This bead assists in quickly locating the guard in proper position during the assembling operation; assures a good seal between the guard and the vehicle body; adds to the protection afforded by the guard against damage, by serving as a resilient buffer; and helps to give the entire guard a somewhat definite shape and proper appearance.

It is also an object of this invention to provide an outer deformable bead at the projecting edge of the guard, this bead serving to strengthen and shape the guard and to protect the vehicle body by acting as a buffer for fending off colliding objects.

The foregoing and other objects will fully appear from a study of the following detailed description, with its appended claims, and the accompanying drawings.

In the drawings:

Figure 1 is a side elevational view of an end of one type of transportation bus, with a preferred embodiment of the present invention mounted on the wheel housing.

Figure 2 is a partial vertical section, taken transversely of the vehicle of Fig. 1 adjacent the axle.

Figure 3 represents an enlarged partial section, taken on the plane of line 3—3 in Fig. 1.

Figure 4 is an end elevational view of the flexible guard of Figs. 1-3, removed from the wheel housing and maintained in its same position relative to the horizontal.

Figure 5 is a sectional view similar to Fig. 3, shows substantially the same guard applied to a vehicle wherein rigid fenders (wheel housings) extend laterally beyond the sides of the vehicle body.

Figure 6 is a partial rear elevational view of a slightly modified form of the invention, wherein the guard is attached to the rear fender of a pleasure vehicle.

Figure 7 is an enlarged sectional view, similar to Figs. 3 and 5, but taken on the vehicle of Fig. 6.

Figure 8 is a partial front elevational view of a pleasure vehicle with a further modified form of flexible guard attached to the front fender thereof.

Figure 9 represents an enlarged vertical section taken transversely of the fender of Fig. 8.

With continued reference to the drawings, wherein like numerals are employed to designate like parts, and with particular reference for the moment to Figs. 1-4, the numeral 10 indicates generally a vehicle of the commercial "twin coach" type, having a box-like body 12 mounted upon wheels 13 and on axle 14. The body is relatively wide, being designed to eliminate the usual laterally projecting rigid fenders, and its side walls 15 are in vertical planes which, if extended, would completely house the wheels within the outer limits of the body. Adjacent the wheels the side walls are recessed in convex semi-circular fashion to form wheel recesses 16.

Each recess 16 terminates adjacent the curved surface of a housing member 17 that extends over the upper portion of the wheel and is supported at its lower edge by transverse frame elements 18. The upper edge of the housing member 17 engages the bottom of a plate 19 of the body. This edge, the plate, and the side wall are maintained in proper assembled position by an angle beam 20 and screw bolt assemblies 22. A semi-circular flat ring 23 is fitted around the recess in the side wall to finish and strengthen it, and to conceal the visible edges of the members 17 and 19. This combined structure forms, in effect, a housing with the recess 16 for receiving the wheel.

The attached device of this invention comprises a flexible guard 24 made up in the form of a skirt adapted to fit within the wheel housing and to project outwardly therefrom through a substantial distance. Its inner edge is clamped into firm surface engagement with the housing 17 by a suitably shaped band 25, the screw bolt assemblies 22 being utilized to perform the clamping operation. The outer edge of the skirt is shaped to curve inwardly toward the axis of the wheel, and at its extremity is enlarged to form a longitudinal strengthening bead 26. The skirt preferably comprises a body of rubber 27, covered with a thin layer of fabric 28 and carrying a second longitudinal bead 29, which forms a sealing and locating strip within the angle formed by the ring 23 and the main body of the guard.

The guard 24 preferably is formed in a special mold to give it a proper and somewhat permanent curved shape and a rigid appearance. The molding process does not produce an article of a given or fixed size and radius, but rather a unit that is adapted for use on any one of a number of similar wheel housings of various shapes and sizes. For example, a relatively large unit may be molded to fit a certain wheel housing and then, if such a unit is to be applied to a smaller housing, it is only necessary to trim a sufficient quantity of material from either or both ends of the guard. The devices of course could be cut in suitable lengths from a roll comprising one continuous unmolded strip of material, but the devices so formed would not have as perfect form and as permanent shape, when mounted, as the molded guard.

The fabric covering 28 not only camouflages the existence of the rubber body 27 and protects it from the natural elements, but also serves to maintain a normal set in the device. The beads 26 and 29 likewise are designed to assist in the maintenance of the desired form or shape of the device. These deformable beads further serve as resilient buffers as, for example, when the vehicle collides or is collided with in a side-swiping by other vehicles or objects. At such times the skirts flex and the beads space the vehicle bodies apart to prevent permanent and visible damage to the latter. After such minor collisions the skirts flex back into normal shape. The bead 29 has the further functions of providing a locating shoulder to expedite the convenience and accuracy of assembly, and to prevent the body of the guard from being bent back too sharply against the lower edge of the ring 23 in cases of side-scraping collisions.

It is desirable, in building a bus or the like for transportation purposes, to utilize a wide body in order to produce a large carrying capacity. In many states, however, there are laws limiting the maximum overall widths of vehicle bodies, and hence conditions may arise where the bodies or fenders do not project sufficiently beyond the wheels, in a lateral direction, to prevent the wheels from splashing and kicking up mud and the like upon the body surfaces that surround the wheel housings. This condition is obviated by the present invention, since the flexible guards may be attached to a rigid body, that is already of the full legal width, without violating the law either actually or in spirit. In one common form of test under the law in question, the bus or coach must be driven between two posts, set at given distances apart, without destroying the latter or damaging the vehicle. This requirement is fully met by the unusually wide vehicle of this invention, wherein the flexible extensions prevent splashing. It should be observed that the guard forms a good seal between itself and the body, and in this respect is unlike the prior conventional fenders which do not seal the joints formed along their lines of engagement with the body proper.

The invention, above described, is advantageously adapted for use on other types of vehicles, even where such vehicles do not approach the full width permitted by law. When so adapted, the guards serve as flexible buffers for warding off colliding objects. Moreover, they have a certain psychological effect which results in the prevention of many damaging or major accidents. Their rigid and permanent appearance causes the drivers of other vehicles to pass the equipped vehicle with the same clearance as they would allow if the guarding equipment was in fact rigid. Consequently, any minor errors in judgment will merely cause a harmless engagement of the flexible guards with the passing vehicle. Likewise, what would normally be a serious error in judgment of clearance will cause only a minor collision resulting in a mere scraping of the rigid parts of the bodies against one another. The adoption of the invention in these other types of vehicles is illustrated in Figs. 5–9.

In Fig. 5 there is shown a section of a type of bus wherein the wheel housing includes a rigid fender 30 that projects laterally beyond the side wall 15. A flexible guard 240, very similar to guard 24 but somewhat narrower, is attached to the fender 30 by bolt assemblies 220. An inner bead 290 is provided in flush engagement with the curved edge of the fender.

In Figs. 6 and 7, a modified form of flexible guard, 32, is attached in similar fashion to the rigid rear fender 33 of the body 34 of a pleasure vehicle.

In Figs. 8 and 9, a similar flexible guard, 35, is applied to the rigid front fender 36 of a pleasure vehicle body. This guard, and also that of Fig. 7, is rather diagrammatically shown, and may be formed with or without the fabric coverings seen in Figs. 3 and 5.

The psychological effect, above mentioned, as produced by the devices of Figs. 5–9, could hardly be obtained if the entire fender construction were made flexible instead of in part rigid. A full flexible fender would be so wide as to be unstable and would not have a deceptive rigid appearance. Moreover, full width flexible fenders are impractical because they will not maintain a normally permanent shape, and are undesirable because they afford no protection to the body proper in cases of collision.

These inventions may be embodied in other specific forms without departing from the spirit or essential characteristics thereof. The present embodiments are therefore to be considered in all respects as illustrative and not restrictive, the scope of the inventions being indicated by the appended claims rather than by the foregoing description, and all changes which come within the meaning and range of equivalency of the claims are therefore intended to be embraced therein.

What I claim and desire to secure by U. S. Letters Patent is:—

What is claimed is:

1. In a vehicle comprising a substantially rigid body designed to form a wheel recess, a relatively freely flexible guard mounted adjacent the outer edge of said wheel recess, said guard being of preformed shape and designed to project laterally beyond the rigid vehicle body.

2. In the construction defined in claim 1, said guard comprising a molded skirt extending substantially beyond the corresponding wheel of the recess to protect the body portion around the recess from splashing by the wheel.

3. In the construction set forth in claim 1, said guard consisting wholly of deformable material and being designed to protect the body from damages that otherwise would result from minor collisions.

4. In combination with a vehicle comprising a body designed to form a substantially rigid wheel housing, a flexible skirt having an approximately semi-cylindrical portion attached along the outer edge of said wheel housing, said skirt being formed to extend outwardly beyond said rigid wheel housing.

5. In the combination of claim 4, said rigid wheel housing being disposed entirely between the side walls of the vehicle body.

6. In the combination specified in claim 4, said rigid wheel housing being of substantially semi-cylindrical shape, and there being a band secured thereto in continuous clamping engagement with said semi-cylindrical portion of said shirt.

7. In the combination defined in claim 4, said flexible skirt being sufficiently narrow and so coated as to have a substantially rigid appearance.

8. A guard designed for application to a wheel housing of a road vehicle body, said guard comprising a curved device having an approximately semi-cylindrical portion designed for sealing engagement with the vehicle body and a flexible skirt-shaped part of relatively narrow width projecting laterally from said portion.

9. In claim 8, said guard being formed of rubber, molded to give it a somewhat permanent normal shape.

10. In claim 8, said flexible skirt-shaped part being covered with fabric to provide it with proper form and appearance.

11. In the guard defined in claim 8, there being a longitudinal enlargement in the form of an approximately circular deformable bead on the projecting edge of said skirt-shaped part.

12. A guard designed for application to the wheel housing of a road vehicle body; said guard comprising an elongated relatively narrow device, one edge of which comprises a portion designed for engagement with the wheel housing and the other edge of which comprises a curved flexible extension projecting laterally from said portion; said device having, at the juncture of said portion with said skirt, a deformable bead designed to fit against the outer edge of said wheel housing.

13. A guarding device of the character described, comprising a molded flexible skirt consisting of a guarding portion provided with an extension designed for attachment within a wheel housing of a road vehicle, said guarding portion being relatively narrow and equipped with a pair of circumferentially disposed beads, one at its outer edge and the other at its juncture with said extension.

14. In a vehicle body having side walls and wheel recesses, a wheel-housing member in the form of a rigid fender projecting laterally outwardly beyond each of said sidewalls, and a flexible guard attached to said fender and forming an outward extension thereof, said flexible guard having a shoulder in flush engagement with the outer edge of said fender.

15. A guard designed for application to a wheel housing of a road vehicle body; said guard comprising a relatively narrow, elongated device formed of rubber, molded to impart to it a substantially permanent curved shape; said device comprising a portion designed for continuous engagement with the vehicle body, and a flexible skirt projecting laterally from said portion.

16. In the combination set forth in claim 15, said guard embodying a flexible sheet of fabric or the like to assist in maintaining the permanence of the molded rubber.

17. A guard designed for application to a wheel housing of a road vehicle body; said guard comprising an elongated curved device having a portion designed for continuous engagement with the vehicle body, and a relatively narrow flexible skirt projecting laterally from said portion, said skirt being formed of rubber, molded substantially to predetermined shape, and having an integral bead at its outer edge to assist in the maintenance of said predetermined shape.

18. In combination with a road vehicle body having a wheel housing, a guard designed for application to the wheel housing, said guard comprising a curved elongated device formed of rubber, having its inner edge fitted in and clamped in continuous engagement with said wheel housing, said inner edge having all transverse lines thereof projecting laterally of the vehicle in horizontal planes, and said guard further comprising an integral outer skirt portion shaped to converge toward the center of said wheel housing.

In testimony whereof I affix my signature.

WILLIAM B. FAGEOL.